April 17, 1934.  J. M. CHRISTMAN  1,955,357
LATHE TOOL
Filed July 9, 1930  2 Sheets-Sheet 1
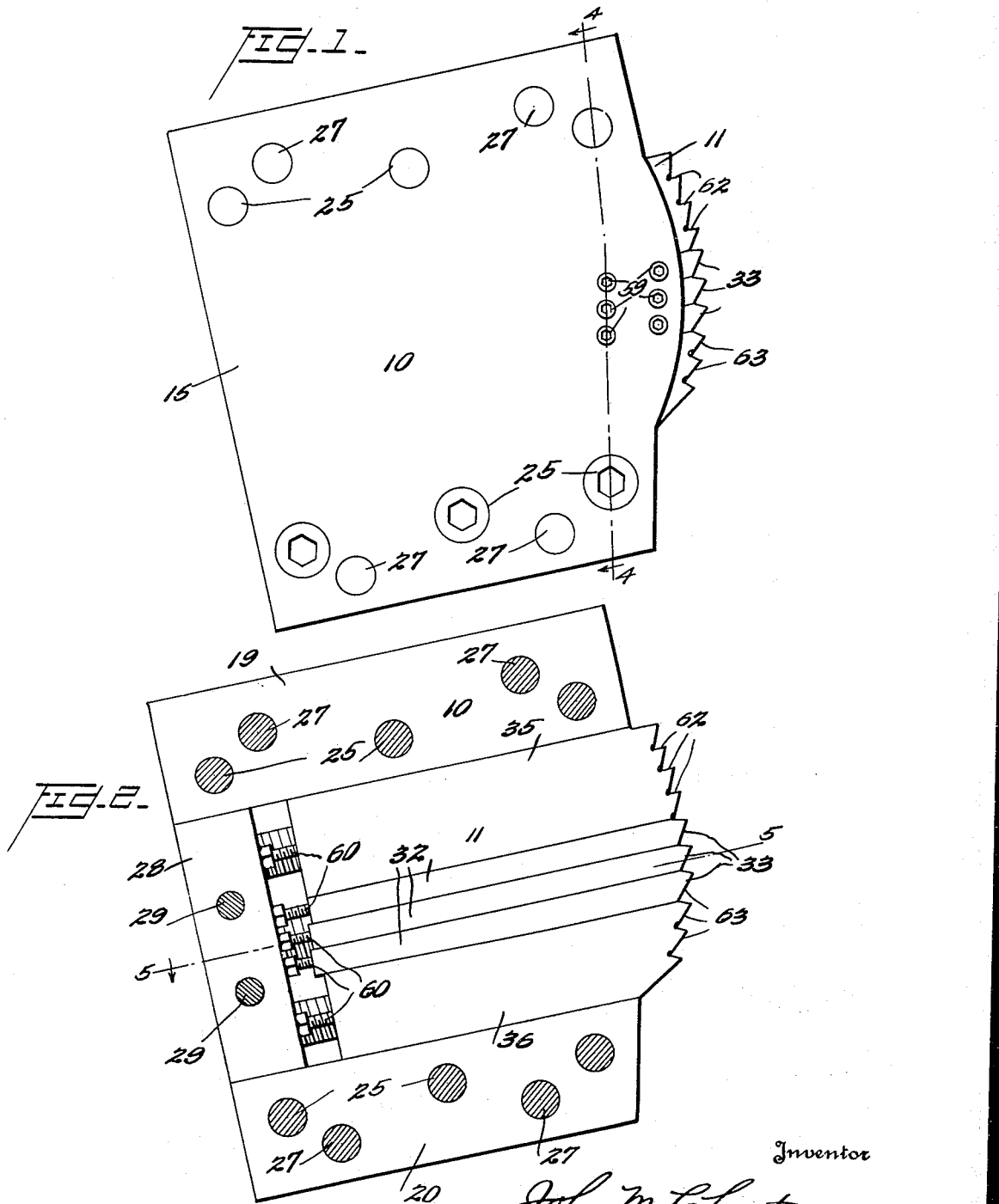

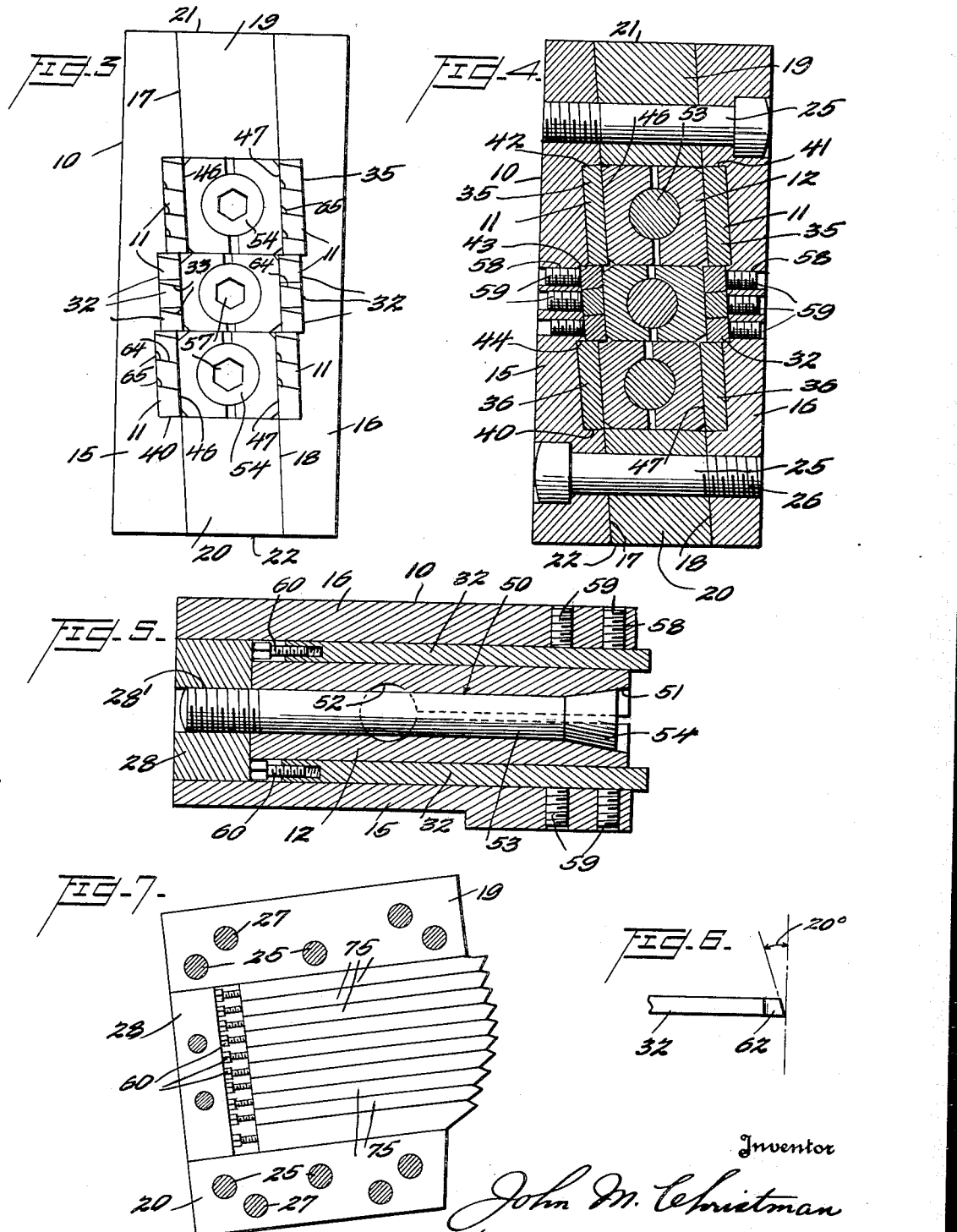

Patented Apr. 17, 1934

1,955,357

UNITED STATES PATENT OFFICE 1,955,357

LATHE TOOL

John M. Christman, Detroit, Mich., assignor to Packard Motor Car Company, Detroit, Mich., a corporation of Michigan Application July 9, 1930, Serial No. 466,806

10 Claims. (Cl. 29—97)

This invention relates to multiple pointed machine tools and more particularly to such tools for use in lathes of the type wherein a non-circular object is turned in accordance with a preformed pattern or templet.

It is a general object of the present invention to provide a novel lathe tool of the type described and particularly an improvement over the tools disclosed in my copending applications, Serial Nos. 362,961 and 442,364 which have become Patent Nos. 1,823,727 and 1,847,171 respectively.

An important feature of the invention resides in the provision of a plurality of independent tools, each pointed or sharpened, with the whole group of tools secured in a single holder in such manner as to provide proper rake, side slope, chip clearance, back slope and the like.

Another important feature of the invention resides in the novel arrangement of a plurality of tools in a single holder in stepped relation, each tool being inclined to the perpendicular for the purpose of providing chip clearance without grinding and the tools being offset with respect to each other to restrict the amount of traverse required for machining a given length of an object.

Still another important feature of the invention consists in novel wedging and clamping mechanism for the tools, together with adjusting means whereby individual tools can be advanced or retracted so that the locus of their cutting edges can follow the desired curve necessary for attaining predetermined results in the shape of the turned article.

Other and further objects and features of the invention will be more apparent to those skilled in the art upon a consideration of the accompanying drawings and following specification, wherein are disclosed two exemplary embodiments of the invention, with the understanding, however, that such changes in and deviations from the disclosure may be made such as fall within the scope of the appended claims without departing from the spirit of the invention.

In said drawings:

Fig. 1 is a side elevation of a lathe tool of the type described.

Figure 2 is a view similar to Fig. 1 but showing one of the side plates removed to illustrate the adjusting mechanism;

Fig. 3 is a front elevation;

Fig. 4 is a section on line 4—4 of Fig. 1;

Fig. 5 is a section on line 5—5 of Fig. 2;

Fig. 6 is a plan view of a portion of a cutter bar; and

Fig. 7 is a view similar to Fig. 2 on a smaller scale and showing a modification.

In certain types of lathes for turning non-circular objects, such for instance as cam crank shaft cheeks or the like the work is rotated between centers in the customary manner and the cutting tool is advanced and retracted in synchronism to the rotation of the work to determine the profile of the object being turned. Usually the tool carriage has a follower member which rides on a pattern which may or may not be of the same size and shape as the finished object. In any case, owing to the eccentricity of the object being turned, the cutting tool must either be equipped with means for changing its angle in order that it may extend substantially normal to the surface at all times or it must have a plurality of cutting points sharpened at different angles and each engaging the object during such different portions of its revolution that it cuts at the proper angle.

The present invention relates particularly to tools of the latter type for use in lathes such as those disclosed in my two copending applications previously mentioned. With those applications disclosing the lathes it is not deemed necessary to show more than the tool in this application since its use will be obvious.

In the prior applications a multipoint lathe tool is disclosed as formed from a single block of tool steel having a more or less serrated or toothed end of the desired profile with each tooth sharpened at such an angle that it engages that portion of the work on which it actually cuts at the most efficient cutting angle. Use of such cutting tools has shown that the teeth near the center receive the largest amount of wear and require sharpening much more often than the other teeth. However, in order to maintain the proper profile all of the teeth must be sharpened at the same time and this is not only a costly and time consuming operation, but it rapidly wears out the whole tool. The present invention provides means whereby separate cutting bars are provided each with one or more cutting edges which can be separately sharpened and adjusted to maintain the desired profile of the cutting edges.

Referring to the drawings, the tool is seen to comprise mainly a holder 10, a plurality of cutter bars 11, and wedge means 12 for clamping the cutter bars in position in the holder.

The holder will be seen to comprise substantially a rectangular box-like member open at the front. It includes the side plates 15, 16, preferably having flat outer faces parallel to each other. The inner faces 17, 18 of these plates are inclined to the outer faces and stepped as clearly seen in Fig. 3 for a purpose to be later described and fitting between the upper and lower portions of these faces are the top and bottom spacing blocks 19 and 20 having their side faces suitably inclined to cooperate with the inner faces of the side plates and each having its outer surface 21 and 22 respectively at right angles to the side faces of the side plates and coextensive with the ends thereof, whereby the profile of the tool holder is a rectangle as seen in Figs. 3 and 4. The side plates are secured to each other by fillister-headed machine screws 25 having their heads countersunk in the one plate and with their threaded ends 26 engaged in tapped holes in the other plate. Their shank portions pass through closely fitting holes in the top and bottom spacing blocks 19 and 20. To insure rigid alignment of the side plates each block 19, 20 is provided with several dowel pins 27 fitting in suitable holes in the side plates.

The back of the tool holder is closed by means of an end block 28 shaped to conform to the aperture between the top and bottom blocks and the side plates and it is secured in position by bolts 29 passing through the side plates as described in connection with the bolts 25.

In use the tool holder is mounted in the carriage of the lathe with the outer faces of the side plates preferably vertical and in a plane at right angles to the axis of rotation of the work. It is desired to use cutter bars which are rectangular in cross-section and in order to eliminate the need for grinding the sides of these cutter bars to provide the proper chip clearance it is preferred to cant or tilt the vertical axis of the bars to such an angle that the sides of the bars provide of themselves the proper chip clearance and this is done by inclining the inner faces of the side plates of the holder as briefly described heretofore. Each side plate is arranged to have stacked up against its inner face a plurality of cutter bars sufficient to fill the vertical space between the upper and lower blocks.

As shown in the preferred form of the invention in Figs. 1 to 6 the center cutter bars 32 are three in number and are square in cross-section as clearly seen in Fig. 4 and each is provided with a single cutting edge 33 as seen in Figs. 1 and 2, since the maximum wear comes at these positions. Much less wear takes place on the upper and lower cutters and for convenience they are shown as plates rectangular in cross section. Each one is of the same thickness as the center cutter bars but of four times the height and each is provided with three or four cutting edges which must be sharpened whenever one is sharpened to maintain the profile.

The inner faces of the side plates are provided each with three V-shaped notches, one for the upper cutter plate 35, one for the three center cutter bars 32, and one of the lower cutter plate 36 and these notches have their longer or side walls inclined to the angle of chip clearance and their short walls at right angles thereto to closely fit the cutters. The bottom notch in the left hand plate has also a bottom wall 40 and the top notch in the right hand wall has an upper wall 41 so that the cutters do not come in contact with the top and bottom separator blocks, but are solely engaged by the side plates against vertical movement and it may be mentioned that the accumulated total vertical height of all of the cutters is accurately adjusted to closely fit between the top and bottom walls of the group of notches.

If, instead of having the notches offset so that the upper corners 42, 43 and 44 thereof in one side plate and the corresponding ones on the other side plate are in the same vertical plane, the cutters were all arranged to have their corresponding faces in the same inclined plane then the amount of traverse required by the tool for cutting the same length of face on the work would be about three times as great and more time would be taken for finishing the same object.

In automotive work there are usually two non-circular objects which can be cut at the same time and particularly is this true when machining crank shafts where there are a pair of crank cheeks for each crank and time can be saved by machining both. For this reason the present tool is provided with a pair of sets of cutters, one against each side plate of the holder as clearly seen in Figs. 3, 4 and 5. The corresponding cutters of the two pairs are always parallel to each other and accurately spaced throughout their length a distance equal to the distance between corresponding faces of the pair of cheeks so that both can be cut at once.

The cutters are held in position by means of wedges 12 whch engage the inner faces of the cutters and are expansible to thrust the cutters against the bottom walls of the notches in the side plates. Each wedge comprises a suitable block of material, preferably tool steel, which is of a length slightly less than the distance from the back block 28 to the curved front edges of the side plates and its rear wall is machined to a flat surface to abut against the rear block. The side walls are not at right angles to the top and bottom walls which are parallel to each other but are inclined as shown at 46 and 47 to engage properly with the side walls of the cutters which as previously mentioned are set at an angle. One wedge is provided for all of the cutters in one pair of side plate notches so that in the preferred modification three wedges are provided.

These wedges are drilled longitudinally for their full length as shown at 50 with the outer end of the bore flared as shown at 51. Somewhat back of the center each wedge is drilled vertically as at 52 forming an opening larger than the bore 50 for the purpose of weakening the wedge to permit expansion. In a plane passing through the axes of the bores 50 and 52 the wedges are slotted from top to bottom and from the front to the opening 52. This permits the two sides to be expanded by means of the expanding bolt 53, the shank of which is of a size to fit the bore 50. This bolt has a head 54 tapered, as shown, on a taper corresponding to that of the flared end 51 of the longitudinal opening in the wedge and the end of the head is provided with a recessed wrench-engaging portion 57 for tightening. The bolts pass clear through the wedges and have their threaded ends engaged in tapped holes 28' in the back block 28 of the tool holder. Thus it will be seen that the bolts not only hold the wedges in position but upon being tightened cause the wedges to expand and tightly press the cutter plates and bars against the bottoms of their respective notches.

To provide for slight inequalities in the thicknesses of the cutter bars 32, three of which are engaged by a single wedge, the side plates are drilled and threaded as at 58, each to receive a pair of screws 59 to engage each cutter bar. In assembling, the center wedge is tightened by means of its bolt as tightly as possible and then the individual screws 59 are tightened up as far as possible to ensure rigid mounting of all of the cutters.

As previously mentioned a certain profile of cutting edges is required. This is initially obtained by properly sharpening the edges of the top and bottom cutter plates 35 and 36 as clearly shown in Figures 1 and 2 and assembling them with properly sharpened central cutter bars within the holder and bringing each cutting edge against a setting templet, not shown, which has its inner profile cut to the exact curvature desired for the cutters. Each cutter bar or blade has in its end opposite the cutting edges a small bolt 60 which by rotation can be moved in and out to engage the near face of the rear block 28 of the tool holder and thus determine the position of the cutting edges and ensure that they remain in this position in spite of any pressure on them resulting from their use.

Each cutting edge is ground after the general arrangement shown in Figure 6 which is a plan of a single cutting edge. The angle marked 20° is subject to considerable variation in accordance with the type of material being worked on and the speed of rotation and feed since it provides the angle of chip.

The top of each cutter is sloped as at 62 and each at a different angle as clearly seen in Figures 1 and 2. By mounting the whole cutter bar assembly at the angle shown in Figures 1 and 2 instead of horizontally this angle 62 need never be inclined downwardly in respect to the horizontal axis of the tool. This prevents the formation of a lip such as is ordinarily necessary to provide back slope for cutting tools. By eliminating such lips the sharpening is materially simplified and there is no waste of material such as results when the lip which is cut down so far by sharpening that its narrowest portion has not the strength to support the cutting edge after which a whole new grinding must be effected, wasting a greater quantity of material and consuming considerable time. The angle of clearance is shown at 63 and of course varies with each tool. Each cutting edge is also provided with a certain amount of side slope 64 seen in Figure 3 but it will be noted that this side slope and the back slope is obtained by a single grinding. Another single grinding produces the clearance and the angle shown in Figure 6. The little relieved portions seen at 65 are merely ground for the purpose of facilitating the final stoning of the tools.

In Figure 7 has been shown a tool holder identical with that disclosed in the previous forms but here instead of providing cutter blades with a plurality of edges at the top and bottom of the holder, a group of individual cutter bars 75 is provided, each with but a single cutting edge thereon. These may be arranged in groups as the center group in the previous form and set into a fewer number of notches than there are cutter bars as will be obvious.

Having thus described the invention, what is claimed as new and desired to be secured by Letters Patent is:—

1. In a lathe tool of the type described, in combination, a box-like holder comprising side plates, top and bottom plates and an end plate, a stack of substantally rectangular cutter bars against the inner face of each side plate, wedges between said stacks clamping said bars in position, each bar being canted to the plane of its plate to provide chip clearance, the bars engaging each other at the angle of cant, said plates being recessed so as to offset certain of said bars to maintain the general plane of each stack parallel to the plane of its plate.

2. In a lathe tool of the type described, in combination, a pair of plates, means securing said plates in spaced relationship, the inner face of each plate being notched in steps inclined to the plane thereof, the corresponding notches on the two plates having their corresponding walls parallel, a cutter bar mounted in each notch in each plate and means between the cutter bars of corresponding notches of the two plates to secure them in position.

3. In a lathe tool of the type described, in combination, a pair of plates, means securing said plates in spaced relationship, the inner face of each plate being notched in steps inclined to the plane thereof, the corresponding notches on the two plates having their corresponding walls parallel, cutter bars mounted in each set of notches and an expansible wedge between the cutter bars of the two plates to secure them in position.

4. In a lathe tool of the type described, having a plurality of superposed cutting edges for cutting non-circular parts wherein certain of the edges get more use than others, the combination of a holder, tools therein where the wear is least each having a plurality of superposed cutting edges, a plurality of superposed cutting tools therein at the positions of maximum wear and each having a single cutting edge, and means on each cutting tool to adjust its position in the holder.

5. A tool holder for pattern lathes including in combination, a pair of side plates, means securing said plates in spaced relation and a back plate, said side plates having locating grooves therein for a plurality of cutter bars, wedges expansible to hold the bars in said grooves and means in said side plates to adjust the pressure of the wedges on the individual bars.

6. A tool holder for pattern lathes including in combination, a pair of spaced side plates, means securing said plates in spaced relation, each side plate adapted to receive against its inner face a stack of separate cutter bars, a plurality of wedges expansible to press the bars against the plates, certain of said wedges engaging a plurality of bars and means on said plates to equalize the pressure of the wedges on said bars.

7. In a tool holder, in combination, a pair of spaced side plates, means securing said plates in spaced relation each side plate adapted to receive a cutter bar against its inner face, a rear plate member, a split wedge between said bars and having a longitudinal bore therethrough and an expander extending through said wedge and having threaded engagement with said rear plate.

8. In a tool holder of the type described, in combination, a pair of spaced side plates, means securing said plates in spaced relation, one of said plates being adapted to receive a cutter bar against its inner face, a rear plate member, an expansible wedge between said plates adapted to hold said bar in position, an expander engaging said wedge and said rear plate and means to adjust said expander in relation to said rear plate.

9. In a lathe tool of the type described, in combination, a pair of side plates, means securing said plates in spaced relation, a group of cutter bars substantially rectangular in cross section contiguous to each other and against the inner wall of each one of said plates, and a single wedge between corresponding bars of the groups engaging and forcing them against the plates.

10. In a lathe tool adapted to be advanced toward and withdrawn from non-circular work parallel to a plane at right angles to the axis of rotation of the work, the combination of a plurality of cutter bars rectangular in cross section and piled one upon the other, each sharpened on one end and substantially at right angles to the height of the pile, and a supporting plate engaging one side of each bar and so formed as to cant said side of each bar out of parallel to said plane and to position the cutting edges of the bars in lateral stepped relation.

JOHN M. CHRISTMAN.